(12) United States Patent
Smart et al.

(10) Patent No.: US 10,917,162 B2
(45) Date of Patent: Feb. 9, 2021

(54) PHASE OR AMPLITUDE COMPENSATION FOR BEAM-FORMER

(71) Applicant: AIRBUS DEFENCE AND SPACE LIMITED, Hertfordshire (GB)

(72) Inventors: Robert Smart, Hertfordshire (GB); Chiok Leong, Hertfordshire (GB)

(*) Notice: Subject to any disclaimer, the term of this patent is extended or adjusted under 35 U.S.C. 154(b) by 224 days.

(21) Appl. No.: 15/103,801

(22) PCT Filed: Dec. 12, 2014

(86) PCT No.: PCT/EP2014/077541
§ 371 (c)(1),
(2) Date: Jun. 10, 2016

(87) PCT Pub. No.: WO2015/086810
PCT Pub. Date: Jun. 18, 2015

(65) Prior Publication Data
US 2016/0329953 A1     Nov. 10, 2016

(30) Foreign Application Priority Data

Dec. 12, 2013   (EP) .................................... 13196855

(51) Int. Cl.
*H04B 7/185* (2006.01)
*H01Q 1/28* (2006.01)
(Continued)

(52) U.S. Cl.
CPC ......... *H04B 7/18515* (2013.01); *H01Q 1/288* (2013.01); *H01Q 3/26* (2013.01);
(Continued)

(58) Field of Classification Search
CPC ... B29C 70/84; B29L 2031/3406; H01Q 3/26; H01Q 1/288; H04B 7/0617; H04B 7/0842; H04B 7/18515; H04B 7/2041
(Continued)

(56) References Cited

U.S. PATENT DOCUMENTS 4,934,196 A * 6/1990 Romano ............... G01F 1/8431
                                                              702/45
6,052,085 A * 4/2000 Hanson .................... H01Q 3/26
                                                              342/373
(Continued)

FOREIGN PATENT DOCUMENTS

EP       2 224 611 A1    9/2010
WO       98/24192        6/1998
(Continued)

OTHER PUBLICATIONS

Notification of Transmittal of The International Search Report and The Written Opinion of the International Searching Authority, or the Declaration dated Feb. 12, 2015 in PCT/EP2014/077541.

*Primary Examiner* — Huy D Vu
*Assistant Examiner* — Nizam U Ahmed (57) ABSTRACT

Phase or amplitude compensation for beam-former Apparatus for an antenna with a plurality of antenna elements, the antenna providing a radiation pattern including one or more beams and the apparatus comprising: a digital beam-former for digitally weighting component signals corresponding to the one or more beams with respective beam-forming weights to provide each component signals of a beam with a phase relationship and amplitude relationship to other component signals of the same beam; and a processing arrangement for processing signal for the beam-former or for processing signals received from the beam-former; the apparatus further comprising compensation means for compensating for at least one out of phase and amplitude distortions between component signals associated with the same frequency channel and related to the same beam arising in the processing arrangement.

15 Claims, 8 Drawing Sheets

(51) Int. Cl.
    *H01Q 3/26*     (2006.01)
    *H04B 7/06*     (2006.01)
    *H04B 7/08*     (2006.01)
    *H04B 7/204*     (2006.01)

(52) U.S. Cl.
    CPC ......... *H04B 7/0617* (2013.01); *H04B 7/0842* (2013.01); *H04B 7/2041* (2013.01)

(58) Field of Classification Search
    USPC ........................................................ 370/317
    See application file for complete search history.

(56) References Cited

U.S. PATENT DOCUMENTS

| | | | |
|---|---|---|---|
| 6,697,633 B1* | 2/2004 | Dogan | G01S 3/74 455/450 |
| 2009/0110033 A1* | 4/2009 | Shattil | H04J 14/0298 375/141 |
| 2010/0220646 A1* | 9/2010 | Brown | H04B 7/185 370/316 |
| 2010/0265925 A1* | 10/2010 | Liu | H04W 72/0446 370/336 |
| 2012/0026998 A1* | 2/2012 | O'Keeffe | H01Q 1/246 370/338 |

FOREIGN PATENT DOCUMENTS

| | | |
|---|---|---|
| WO | 2008/107710 A1 | 2/2008 |
| WO | 2008/139219 A2 | 11/2008 |

* cited by examiner

PHASE OR AMPLITUDE COMPENSATION FOR BEAM-FORMER

FIELD OF THE INVENTION

The invention relates to signal processing and particularly, to the conversion between the analogue and the digital domain of signals and to beam-forming of digital signals.

BACKGROUND OF THE INVENTION

It is often desired to generate multiple simultaneous beams covering a large field of view in commercial communication satellite systems. To generate multiple simultaneous beams, satellites can be provided with a digital beam-former and an antenna comprising a large number of antenna elements wherein a signal of an antenna element is multiplied by a complex weight in the beam-former to give it a phase and amplitude relationship with respect to the antenna element signals of the other antenna elements that allows the beams to be generated. In receive mode, the signals received in the antenna elements will need to be amplified, down-converted and digitised before they can be beam-formed and, in transmit mode, the beam-formed signals will need to be converted into analogue form, up-converted to a transmission frequency and amplified before they can be transmitted by the antenna elements. In order for the noise in the beams to be reduced, it is important that the relative phase and amplitude relationship between different antenna element signal components corresponding to different beams is maintained between the antenna elements and the beam-former.

In systems where the processing of a large number of narrow bandwidth signals are processed in parallel a larger number of processing chains with identical or similar components are often used. If the signals need to be converted from analogue to digital domain or digital domain to analogue domain, each chain would typically include a low bandwidth analogue to digital converter or a low bandwidth digital to analogue converter. Recently, higher bandwidth converters have been used to convert composite signals formed from the signals corresponding to a number of those chains and the converted signals can then be split into the signal components again for further processing after the conversion. By sharing an ADC or a DAC between a number of processing chains, the overall number of converters required is reduced.

The invention was made in this context.

SUMMARY OF THE INVENTION

According to the invention, there is provided an apparatus for an antenna with a plurality of antenna elements, the antenna providing a radiation pattern including one or more beams and the apparatus comprising: a digital beam-former for digitally weighting component signals corresponding to the one or more beams with respective beam-forming weights to provide each component signal of a beam with a phase relationship and amplitude relationship to other component signals of the same beam; and a processing arrangement comprising a converter for converting a composite signal comprising a plurality of frequency stacked antenna element signals from analogue to digital form and a demultiplexer for demultiplexing the digital signal into component signals present in said antenna element signals for providing to the digital beam-former or a multiplexer for multiplexing beam-formed component signals, for forming a number of antenna element signal, from the beam-former into a composite signal comprising said number of antenna element signals stacked with respect to each other in frequency and a converter for converting the composite signal into analogue form; the system further comprising compensation means for compensating for at least one out of phase and amplitude distortions between component signals associated with the same frequency channel and related to the same beam arising in the processing arrangement, wherein for a given component signal, the compensation means are configured to determine a plurality of compensation complex weights each corresponding to a relative distortion introduced by a component within the processing arrangement, and multiply the plurality of compensation complex weights to determine a final compensation weight with which to weight the component signal.

The compensation means can be provided in said digital beam-former.

The digital beam-former can comprise adjusters for adjusting at least one out of phase and amplitude of the component signals, each adjuster being configured to apply a weight to a respective component signal corresponding to a beam-forming weight and a compensation weight, the compensation weight being selected to compensate for at least one out of a phase and amplitude distortion arising in the processing arrangement relative to other component signals for the same beam.

The compensation means can be provided separately from said beam-former in said processing arrangement, and can comprise adjusters for adjusting at least one out of phase and amplitude of the component signals, each adjuster being configured to apply a compensation weight to a respective component signal selected to compensate for at least one out of a phase and amplitude distortion arising in the processing arrangement relative to other component signals for the same beam.

The compensation weight can be a complex number, and said adjusters can be configured to adjust their respective component signals by carrying out a complex multiplication.

The apparatus can comprise a receive system, and said processing arrangement can comprise: a plurality of frequency converters, each frequency converter being associated with an antenna element and being configured to frequency convert an antenna element signal associated with its antenna element to an intermediate frequency band, wherein said plurality of frequency converters are grouped into a number of groups and each frequency converter in each group is configured to frequency convert its antenna element signal to a different frequency band; a plurality of combiners, each combiner being associated with a group of frequency converters and being configured to combine the antenna element signals in said different frequency bands to a composite signal; a plurality of analogue to digital converters, each analogue to digital converter being configured to convert a different composite signal into digital form; and a plurality of demultiplexers for demultiplexing the converted signals.

The compensation means can be configured to compensate for a phase distortion in the demultiplexer, and can be further configured to apply a compensation determined based on intermediate frequency band from which component signal is down-converted in the demultiplexer.

The compensation means can be configured to compensate for a phase distortion generated in the analogue to digital converter, and the compensation means can be further configured to apply a compensation determined based on the timing of a clock edge of a sampling clock of the analogue to digital converter relative to the timing of clock edges of sampling clocks of other analogue to digital converters of the plurality of analogue to digital converters.

The apparatus can comprise a transmit module, and the processing arrangement can comprise: a plurality of multiplexers for multiplexing beam-formed component signals, each multiplexer being configured to multiplex beam-formed component signals for forming a number of antenna element signal into a composite signal comprising said number of antenna element signals stacked with respect to each other in different intermediate frequency bands; a plurality of digital to analogue converters, each digital to analogue converter being configured to convert a different composite signal into analogue form; a plurality of splitters for splitting each digital to analogue converted signal into the antenna element signals present in said digital to analogue converted signal in the different intermediate frequency bands; and a plurality of frequency converters, each frequency converter being associated with a separate antenna element and being configured to frequency convert an antenna element signal from one of said frequency bands to a frequency at which they will be transmitted by a respective antenna element.

The compensation means can be configured to compensate for a phase distortion by the multiplexer, and can be further configured to apply a compensation determined based on intermediate frequency band to which component signal is up-converted in the multiplexer.

The compensation means can be configured to compensate for a phase distortion generated in the digital to analogue converter, and can be further configured to apply a compensation determined based on the timing of a clock edge of a sampling clock of the digital to analogue converter relative to the timing of clock edges of sampling clocks of other digital to analogue converters of the plurality of digital to analogue converters.

According to the invention, there is also provided a method for use with an antenna with a plurality of antenna elements, the antenna providing a radiation pattern including one or more beams, the method comprising: digitally weighting component signals corresponding to the one or more beams with respective beam-forming weights to provide each component signal of a beam with a phase relationship and amplitude relationship to other component signals of the same beam; and using a processing arrangement to convert a composite signal comprising a plurality of stacked antenna element signals from analogue to digital form, and demultiplex the digital signal into component signals present in said antenna element signals before digitally weighting the component signals; or using a processing arrangement to multiplex the digitally-weighted component signals, for forming a number of antenna element signals, into a composite signal comprising said number of antenna element signals stacked with respect to each other in frequency, and convert the composite signal from digital to analogue form; wherein the method further comprises: compensating for at least one out of phase and amplitude distortions between component signals associated with the same frequency channel and related to the same beam arising during conversion and multiplexing or demultiplexing of the component signals, by determining a plurality of compensation complex weights for a given component signal, each corresponding to a relative distortion introduced by a component in the processing arrangement, and multiplying the plurality of compensation complex weights to determine a final compensation weight with which to weight the component signal.

Digitally weighting the component signals can comprise: adjusting at least one out of phase and amplitude of the component signals, by applying a weight to a respective component signal corresponding to a beam-forming weight and a compensation weight, wherein the compensation weight can be selected to compensate for at least one out of a phase and amplitude distortion arising during conversion and multiplexing or demultiplexing of the component signals, relative to other component signals for the same beam.

In embodiments in which the method comprises converting the composite signal from analogue to digital form and demultiplexing the digital signal into component signals before digitally weighting the component signals, the method can further comprise: frequency converting different antenna element signals within a group of antenna element signals to different intermediate frequency bands; and combining the antenna element signals in said different frequency bands to obtain the composite signal to be converted from analogue to digital form.

In embodiments in which the method comprises multiplexing the digitally-weighted component signals into the composite signal and converting the composite signal from digital to analogue form, the number of antenna element signals comprised in the composite signal can be stacked with respect to each other in different intermediate frequency bands, and the method can further comprise: splitting the digital to analogue converted signal into the antenna element signals present in said digital to analogue converted signal in the different intermediate frequency bands; and frequency converting each one of said antenna element signals from said intermediate frequency band to a frequency at which said one of the antenna element signals will be transmitted by a respective antenna element.

BRIEF DESCRIPTION OF THE DRAWINGS

Embodiments of the invention will now be described, by way of example, with reference to the accompanying drawings, in which.

DETAILED DESCRIPTION

Figure 1:
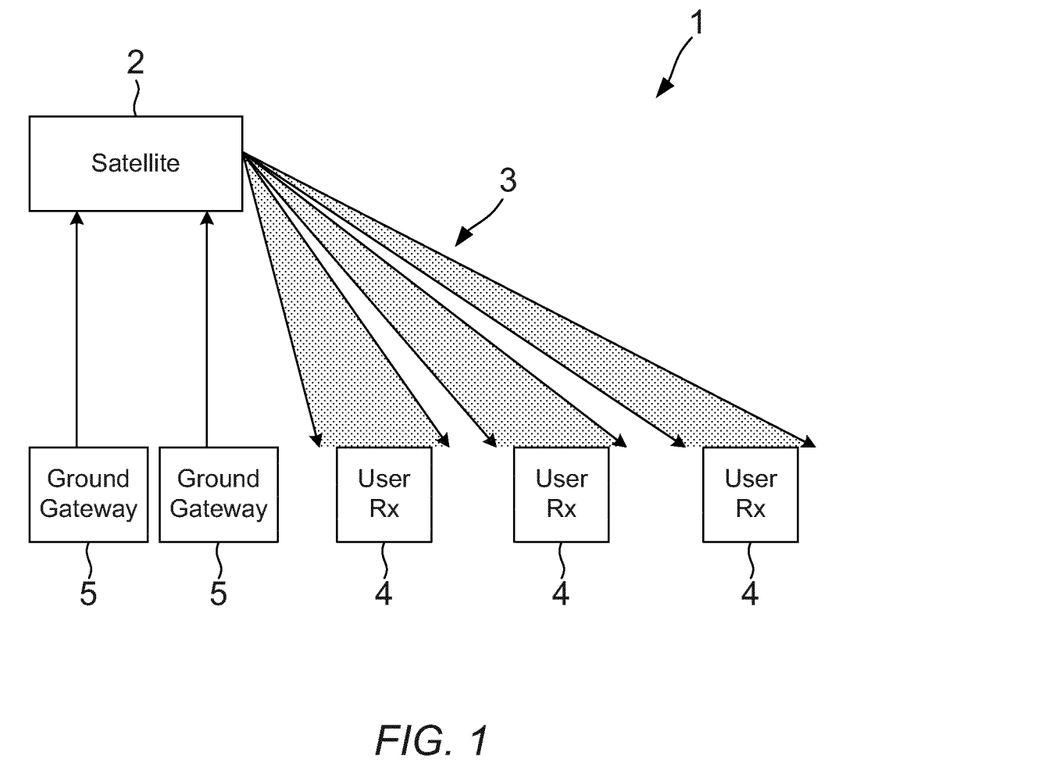
FIG. 1 is a schematic diagram of a satellite antenna system.

With reference to FIG. 1, a satellite communication system 1 is shown comprising a satellite 2 configured to generate a plurality of communication spot beams 3 in a region. The satellite 2 may be a geostationary satellite providing coverage over a global area. The satellite 2 may communicate with a plurality of user devices 4 located in the coverage area of the beams 3. The satellite 2 may further communicate with a plurality of ground stations 5 providing gateways and control stations. The satellite 2 may receive control signals from said ground stations 5 for operating the satellite 2. The satellite 2 may further receive information to be transmitted in said communication beams 3 or may transmit information received in said information beams 3 to the ground stations 5. The communication beams 3 may be generated using beam-forming techniques. Different ground stations may be responsible for different beams.

The receive and transmit modules for receiving and transmitting the plurality of communication beams will now be described with respect to FIGS. 2 and 3.

Figure 2:
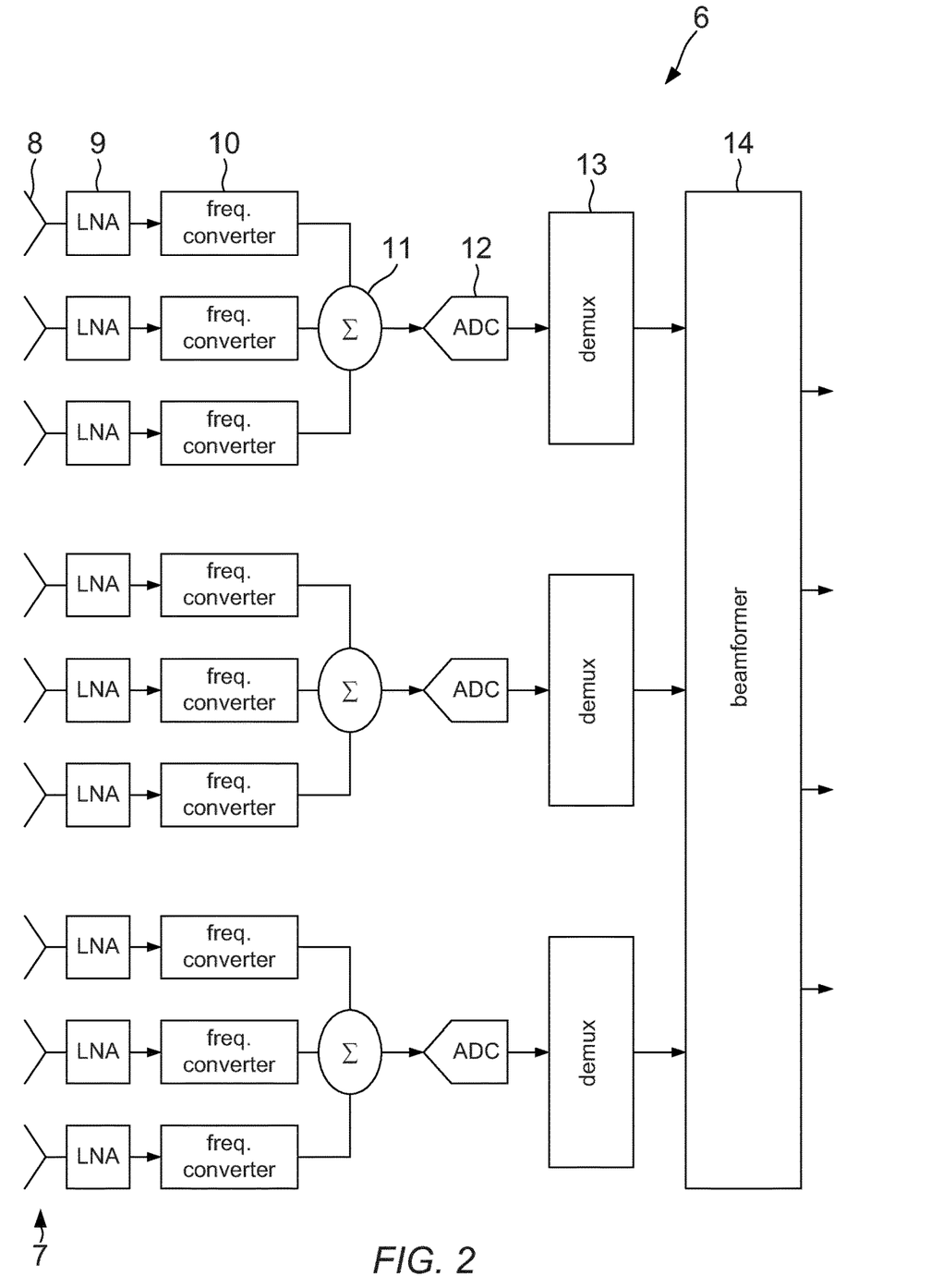
FIG. 2 is a schematic diagram of a receive module of a satellite for forming a plurality of beams.

With reference to FIG. 2, the receive module 6 comprises a receive phased array antenna 7 comprising a plurality of antenna elements 8 arranged in a two-dimensional matrix for receiving the signals in the uplink. Only nine antenna elements are shown in FIG. 2, for the sake of clarity, but it will be appreciated that the antenna 7 may comprise a large number of elements. The antenna may be a phased direct radiating array (DRA) or an imaged radiating array (IRA). The receive module further comprises a processing arrangement comprising a plurality of amplifiers 9, frequency converters 10, combiners 11, analogue to digital converters (ADCs) 12 and frequency demultiplexers 13. Additionally, the receive module 6 comprise a beam-former 14.

Each antenna element 8 receives a signal comprising component signals corresponding to one or more carriers spanning a set of communication frequency channels. Different components of the carriers are received by different antenna elements. The amplifiers 9 may comprise low noise amplifiers (LNA) for amplifying the received antenna element signals.

Each amplified signal is then provided to a respective frequency converter 10 for down-converting the amplified signals. The frequency converters are grouped into groups and each group is associated with its own combiner 11 and ADC 12. In FIG. 2, each broadband ADC 12 handles the antenna element signals for three separate antenna elements. However, it will be appreciated that this is just an example and the number of antenna element signals digitised by each ADC 12 depends on the implementation. Each frequency converter 10 translates its received signals with consideration to the frequency of the output signals of the other frequency converters of the same group. Each frequency converter 10 receives a signal at the same frequency but the signals are output from the frequency converters in non-overlapping intermediate frequency bands. In other words, the signals processed by a group of frequency converters are stacked in frequency with respect to each other. Consequently, a local oscillating signal of a different frequency is provided to each frequency converter 10 in a group. The stacked frequency channels are then summed in the combiner 11 and provided to the ADC 12 as a composite broadband signal for conversion into the digital domain. Consequently, instead of using one ADC for each antenna element signal, a reduced number of broadband ADCs 12 can be used with each ADC simultaneously converting a number of antenna element signals.

The output of each ADC 12 is provided to a demultiplexer 13 that separates the converted signal into a number of component signals. Each component signal may correspond to a different frequency communication channel in the received antenna element signals. In other words, a set of component signals corresponding to the set of communication frequency channels are provided for each antenna element 8. The demultiplexer also translates the frequency of the component signals down to baseband or other common frequency at which the signals can be processed in the beam-former 14. The demultiplexer 13 may comprise a poly-phase filter. However, it will be realised that this is just an example and any suitable demultiplexer such as that based on per channel filter and multi-stage half-bank filter can be used.

Sets of demultiplexed component signals corresponding to the same communication frequency channel from different receive antenna elements are provided to the beam-former 14 for routing and for the application of beam weights to form the beams. In some embodiments two or more beams may share the same frequency channel (frequency re-use), and in such embodiments the frequency re-used channel signal can be duplicated for each beam such that beam-forming phase and/or amplitude adjusters 33 may adjust the component signals related to different beams. The weighted component signals for each beam are then summed prior to the synthesis poly-phase filter. When the beam signals have been formed from the weighted component signals, the beam signals may be transmitted to a ground station 5 using a ground station transmit module. For example, the transmit antenna for communication with the ground station may include a single feed per beam antenna. Alternatively, the sets of demultiplexed component signals corresponding to the same communication frequency channel from different receive antenna elements can be transferred to equipment on the ground where the application of beam weights to form the beams is performed.

In addition to routing the signals and applying beam weights to form the beams, the beam-former may also apply a phase and amplitude distortion to the component signals to compensate for any relative distortion in phase and/or amplitude between component signals corresponding to the same communication frequency channel and the same beam introduced in the paths between the antenna element 8 and the beam-former 14, as will be described in more detail below.

Figure 3:
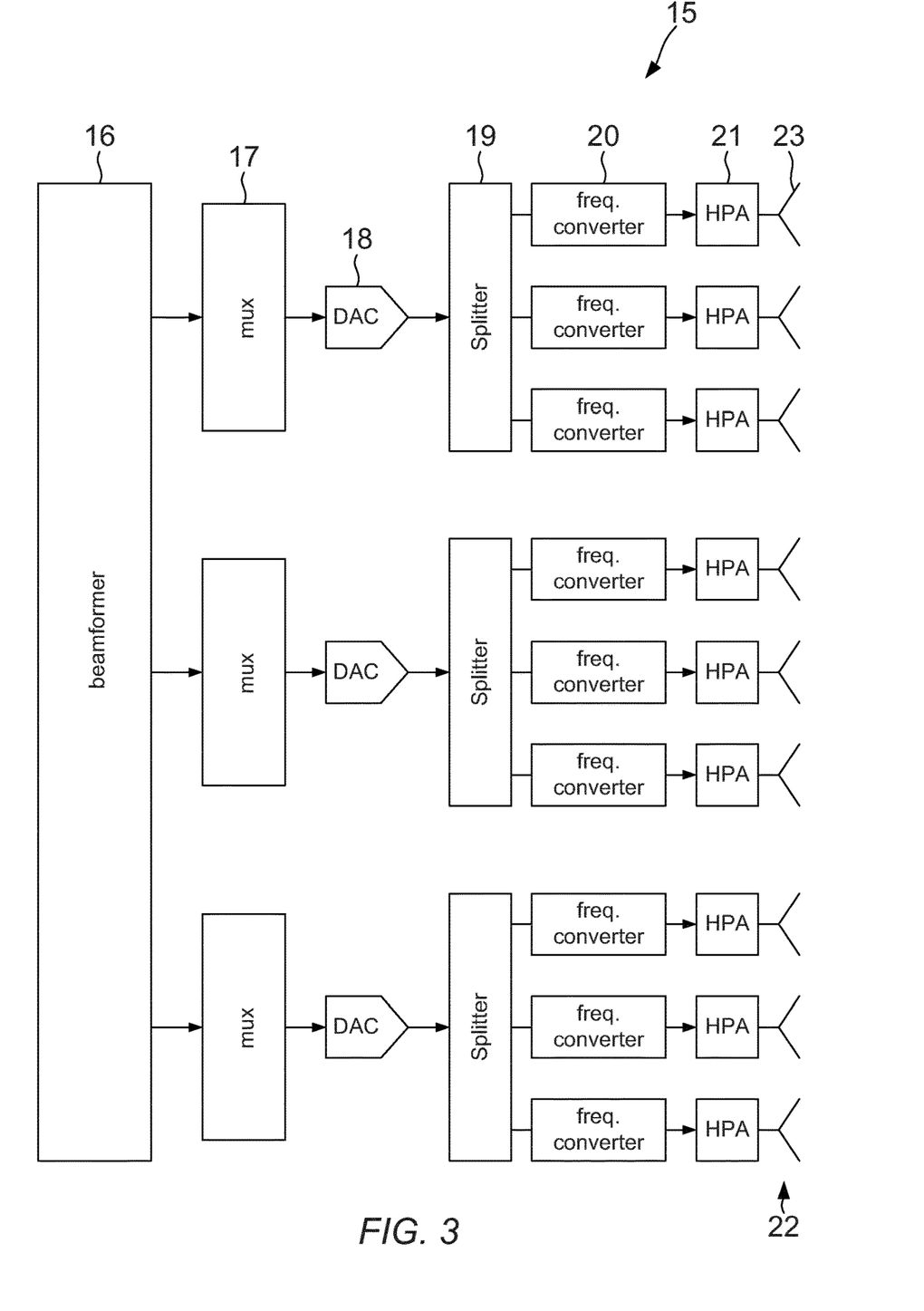
FIG. 3 is a schematic diagram of transmit module of a satellite for forming a plurality of beams.

With reference to FIG. 3, the transmit module 15 of the satellite 2 for generating the plurality of communication beams 3 for the user devices comprises a beam-former 16 and a processing arrangement comprising a frequency multiplexers 17, digital to analogue converters (DACs) 18, splitters 19, frequency converters 20 and amplifiers 21. The transmit module 15 also comprises a transmit phased array antenna 22 comprising a plurality of antenna elements 23 in a two-dimensional matrix for transmitting the downlink signals. Only nine antenna elements are shown in FIG. 3, for the sake of clarity, but it will be appreciated that the antenna 22 may comprise a large number of elements 23. The antenna may be a phased direct radiating array or an imaged radiating array.

One or more signals centred at baseband or other common frequency corresponding to different beams are provided to the beam-former 16. These signals can be provided by equipment such as that shown in FIG. 2, which receives signals from one or more antenna elements, converts the received signals from the analogue domain to the digital domain, and frequency demultiplexes and down-converts the component signals to baseband or other common frequency. The component signals may have been received from the ground stations using a ground station receive module comprising, for example, a single feed per beam antenna. The beam-former 16 generates beam signal components for different antenna elements 23 from the received component signals at baseband or other common frequency, by duplicating each component signal as many times as the number of antenna elements and applying beam weights to them, and sends a plurality of the beam signal components to each multiplexer 17. Specifically, the beam-former 16 routes the signals and applies beam weights to the different beam signal components such that when transmitted by the antenna elements 23 the beams are directed to the desired locations. Here, the beam signal components refer to signals outputted by the beam-former 16 which are to be transmitted by the antenna elements 23. Each beam signal component is a signal intended for a given one of the antenna elements 23, to be transmitted by that antenna element as a beam signal.

The weighted beam signal components from the beam-former 16 are frequency multiplexed in the multiplexer 17 and converted into the analogue domain by the DACs 18. Each multiplexer associated with a DAC frequency multiplexes together the antenna element signals for a number of antenna elements. In FIG. 3, each DAC handles the antenna element signals for three separate antenna elements but it will be appreciated that the number of antenna elements per DAC depends on the exact implementation. The weighted beam signal components are routed to the multiplexer 17 and DAC 18 associated with the antenna element 23 by which the component signal will be transmitted. The beam signal components to be transmitted by the same antenna element are frequency stacked in the frequency multiplexer with the same relationship to each other as they would have when they are transmitted in the downlink. Moreover, each set of component signals forming an antenna element signal of the antenna element signals associated with a particular DAC is provided in a different non-overlapping frequency channel to the other sets of the other antenna element signals associated with that DAC. The frequency stacking is carried out to allow a reduced number of broadband DACs with each DAC simultaneously converting more than one antenna element signal to the analogue domain. The multiplexer 17 may be a synthesis poly-phase filter. However, it will be appreciated that this is just one example and any suitable multiplexer such as that based on per channel filter and multi-stage half-bank filter can be used.

After the composite signal has been converted into the analogue domain it is provided to the splitters 19, which split the converted signals into the separate antenna element signals present in the composite signals. Each antenna element signal will be in a different frequency band. The frequency converter 20 are therefore provided to up-convert the signals to the same frequency at which they will be transmitted. Consequently, a group of frequency converters are associated with DAC 18 and splitter 19 and each frequency converter 20 of each group operates using a local oscillating signal of a different frequency. The up-converted signals are then provided to the amplifiers 21 for amplification before they are transmitted by the antenna elements 23. The amplifiers may comprise High Power Amplifiers (HPAs).

In addition to routing the signals and applying beam weights to form the beams, the beam-former 16 may also apply a phase and amplitude pre-distortion to the component signals to compensate for any relative distortion in phase and/or amplitude between component signals corresponding to the same communication frequency channel and the same beam introduced in the paths between the antenna elements 23 and the beam-former 16, as will be described in more detail below.

It will be appreciated that although the receive module 6 and the transmit module 15 have been described separately, some of the components of the modules may have both a receive mode and a transmit mode and may be used in both the receive module and the transmit module. Consequently, some of the components described with respect to FIG. 2 as belonging to the receive module may also form part of the transmit module described with respect to FIG. 3 and vice versa. For example, the phased array antenna may have both a receive mode and a transmit mode and the same antenna elements may be used by both the receive module and the transmit module. Moreover, the beam-former 14 of the receive module and the beam-former 16 of the transmit module may form part of the same beam-former.

Moreover, it will be appreciated that although the satellite 2 has been described as communicating with the ground stations using, for example, single feed per beam antennas, a phased array antenna may also be used for communicating with the ground stations. Moreover, instead of transmitting beam signals to the ground stations, the satellite 2 may forward any signals received using a phased array to another satellite or other user receivers. Similarly, instead of receiving the information to be transmitted in the multiple spot beams to the user devices from a ground gateway, the satellite may receive the information from other user devices or another satellite.

It will now be explained how the analysis poly-phase filter in the receive module 6 and the synthesis poly phase filter in the transmit module 15 can introduce phase distortions in the component signals. The explanation based on a poly-phase filter demultiplexer in the receive module where the component signals are down-converted to baseband frequency is provided by way of example only, and phase distortions in the component signals after down-conversion will also be relevant for any demultiplexer design which downconverts the component signals to any common frequency prior to the beamformer. Similarly, the explanation based on a poly-phase filter multiplexer in the transmit module where the component signals are up-converted from baseband frequency is merely exemplary, and phase distortions in the component signals after up-conversion will also be relevant for any multiplexer design which upconverts the component signals from any common frequency after the beamformer.

Figure 4:
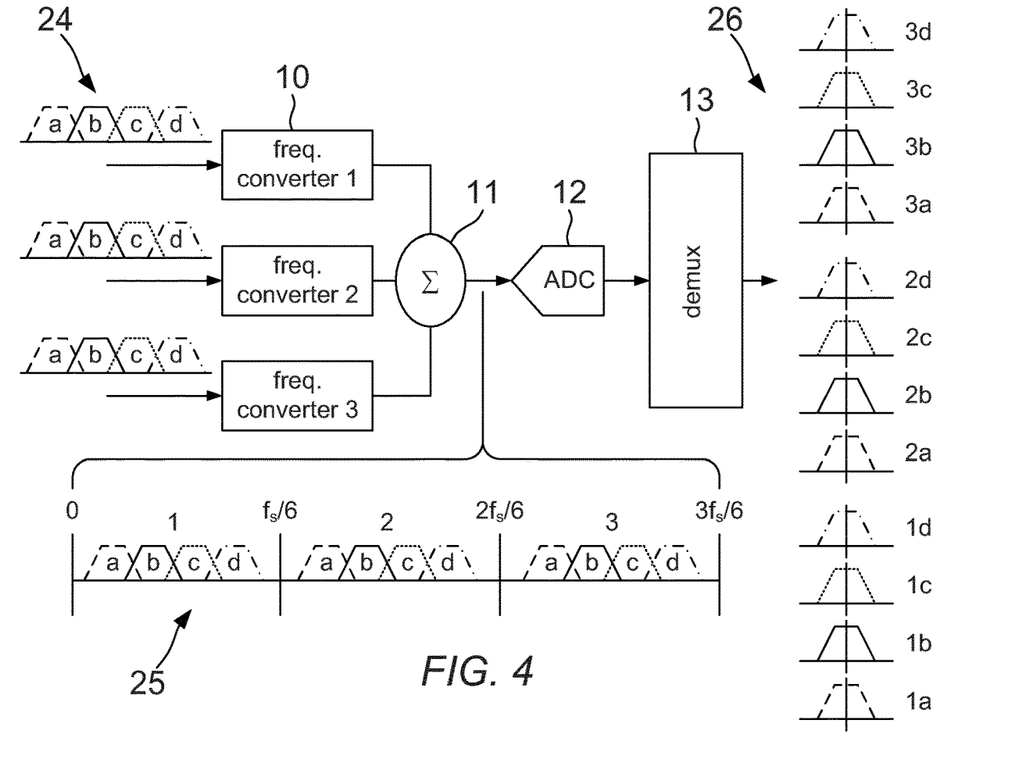
FIG. 4 illustrates the frequency translations of component signals of the beams as they are processed in the satellite.

With reference to FIG. 4, each antenna element signal 24 is shown to include four communication frequency channels a, b, c and d. A carrier may be made up of one or more communication frequency channels. Alternatively, a communication frequency channel may include more than one carrier. For example, frequency channels a and b may relate to one beam, frequency channel c may relate to a second beam and frequency channel d may relate to two separate beams, either reusing the same frequency or being provided at separate non-overlapping frequencies within channel d.

With reference to FIG. 4, an analogue to digital converter 12 is shown for converting a composite signal including three antenna element signals. As explained with respect to FIG. 2, to provide a composite signal 25 to the ADC 12, frequency converters 10 frequency stack the three antenna element signals making up the composite signal. In the example of FIG. 4, the first frequency converter frequency converts the first antenna element signal to an intermediate frequency band between 0 Hz and $f_s/6$ Hz where $f_s/2$ is the Nyquist sampling rate of the ADC. As further shown in FIG. 4, the second antenna element signal is converted into an intermediate frequency band located between $f_s/6$ and $2f_s/6$ and the third antenna element signal is converted to an intermediate frequency band located between $2f_s/6$ and $f_s/2$.

When the composite signal is analysed in poly-phase filter 13, the channels are split into the component signals 26 corresponding to the individual communication frequency channels of each individual antenna element signal 24 and down-converted to base-band. Consequently, after the poly-phase filter all the frequency channels are located at base-band, as shown in FIG. 4. The poly-phase filter introduces a phase shift in the signals it processes and the amount of phase shift is dependent on the frequency from which they were down-converted. This is typically not a problem when a separate poly-phase filter is provided for each antenna element signal since two component signals corresponding to the same communication frequency channel would be down-converted from, or up-converted to, the same frequency band. However, when a number of antenna element signals are stacked to be converted by the same ADC or DAC, different component signals belonging to the same beam are down-converted from or up-converted to different frequencies and, as a result, different phase shifts are introduced in different component signals corresponding to the same beam and communication frequency channel. More specifically, for example channel b of the first antenna element signal will be phase shifted a different amount to channels b of the second and third antenna element in FIG. 4. Since the beam-forming relies on the phase relationship between the channel signals, the difference in phase shift needs to be compensated for before a beam is formed from the component signals belonging to communication frequency channel b.

The synthesis poly-phase filter 17 introduces a phase shift in the transmit module 15 in a corresponding way to how the poly-phase filter 13 introduces a phase shift in the receive module 6 described above. The synthesis poly-phase filter frequency 13 translates each component signal at baseband to an appropriate intermediate frequency band and combines the components to form a composite signal. The synthesis poly-phase filter 17 introduces a phase shift in the component signals which is dependent on the frequency of the intermediate frequency band to which the component signals are converted. Consequently, the component signals corresponding to the same beam may be phase shifted different amounts and this discrepancy will need to be compensated for in order to ensure that the beams are formed in the desired direction.

It will be appreciated that although it has been described with respect to FIG. 4 how a phase shift may arise in the processing of a poly-phase filter, any demultiplexer or multiplexer such as that based on per channel filter and multi-stage half-bank filter can introduce a phase shift.

Figure 5:
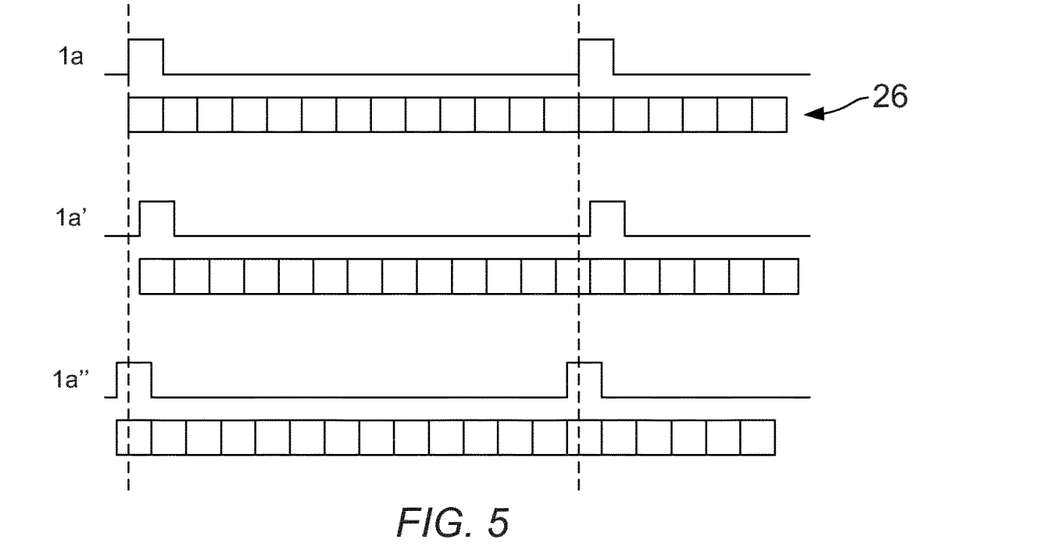
FIG. 5 illustrates the timing of different sampling clock signals of different analogue to digital converters.

In addition or instead of the phase shifts applied by the poly-phase filters 13, 17, phase distortions may also be generated by the ADCs and the DACs. With reference to FIG. 5, each ADC is provided with a clock signal on which the conversion into digital or analogue form is based. As shown in FIG. 5, an ADC will sample the input analogue signal at short time intervals, the duration of which is determined by the maximum frequency of the input signal. In FIG. 5 the first row of samples correspond to a component signal 26 processed by the first ADC, the second row of samples correspond to a component signal 26 processed by the second ADC, and the third row of samples correspond to a component signal 26 processed by a third ADC. The exact times at which the signal is sampled is determined by the edge of a clock signal provided to the ADCs. The edges of the different clock signals provided to the different ADCs may not coincide and as a result, the different samples are phase shifted a different amount. In a corresponding way, a DAC will also sample a digital signal in accordance with a sampling clock and a relative phase shift between signals output by different DACs may result from the differences in the timings of the clock edges of the sampling clocks provided to the DACs.

For ADCs and DACs having a relatively low sampling rate, the different timing of the dock edges of the different sampling clocks do not have a significant effect on the different phases of the signals. However, since the wideband ADCs and DACs used in the transmit and receive modules of FIGS. 2 and 3 require a significantly higher sampling rate, the different timing of the clock edges can have a significant effect on the relative phases of the signals converted by the different converters. Each ADC and DAC will introduce a phase shift and the amount will vary between instances.

Figure 6:
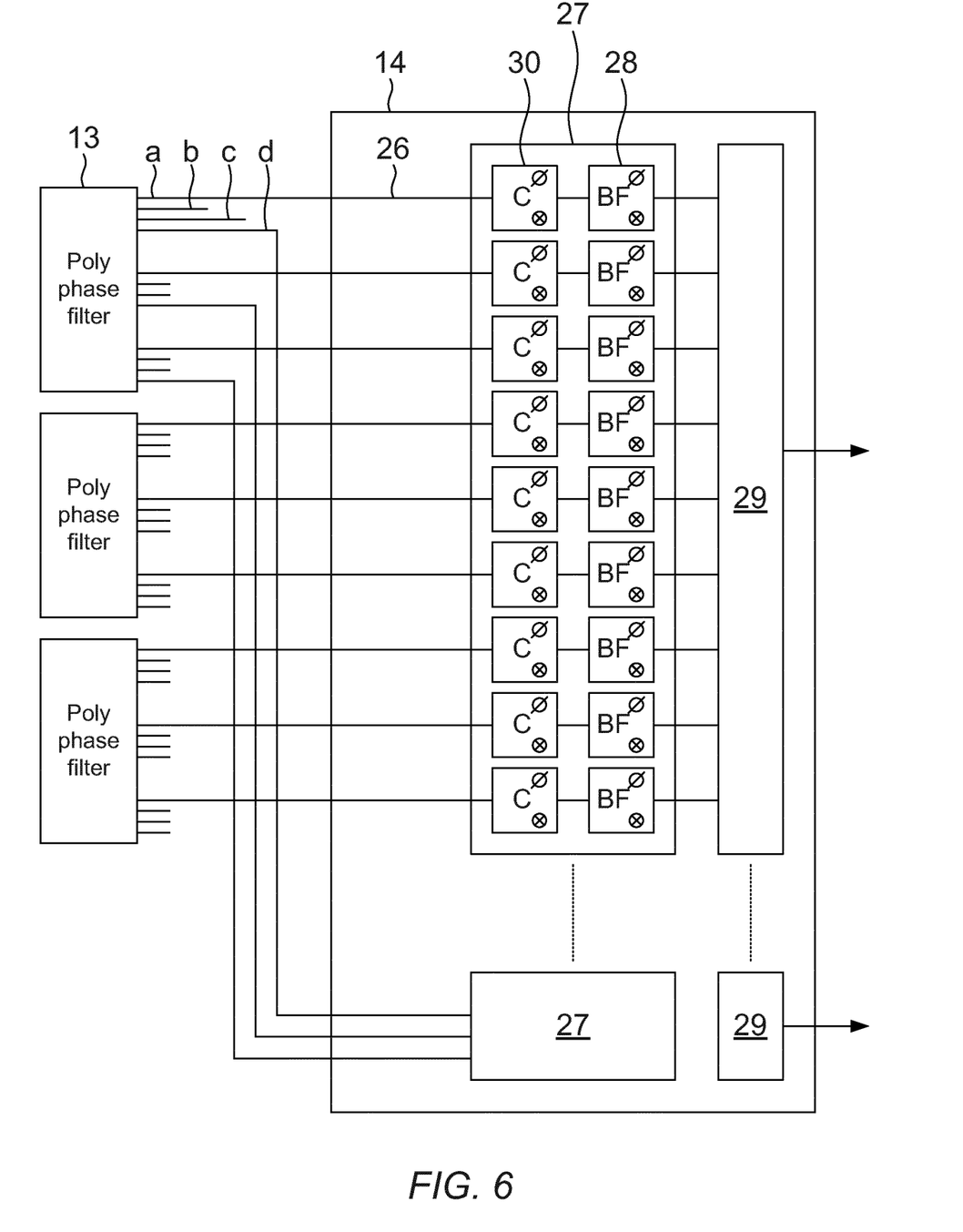
FIG. 6 is a schematic diagram of components of a beam-former of the receive module according to some embodiments of the invention.

According to FIGS. 6 and 7, it will now be described how the compensation for phase shifts introduced in the demultiplexers/multiplexers and the ADC/DACs is carried out. As shown in FIG. 6, the beam-former of the receive module comprises one beam-forming network 27 for each beam. If the same frequency is reused for different beams, there would be more than one beam-forming network for a particular channel. Moreover, if a beam spans more than one frequency channel, there would be one beam-forming network for each of the channels and the beam-formed signals from all the channels may then be frequency re-multiplexed after the beam-forming processing. Each poly-phase filter outputs 12 component signals, four for each antenna element, as in the example described with respect to FIGS. 2 and 3. Each ADC and poly-phase filter processes the component signals of three antenna elements. The beam-former routes all the component signals associated with the same communication frequency channel to the same beam-forming network. The beam-forming network shown in detail in FIG. 6 receives all the component signals associated with one communication channel "channel a". Since the poly-phase filters output component signals from three antenna elements, three component signals 26 are provided from each poly phase filter to the beam-forming network 27 shown in detail in FIG. 6. Each beam-forming network includes a phase and amplitude adjuster 28 for each component signal. The phase and amplitude adjuster may be a discrete multiplier which weights its respective component signal by carrying out a complex multiplication of the component signal with a complex beam weight, corresponding to a phase and/or amplitude adjustment. All the weighted signals corresponding to the same beam are then added together in an adder 29 to form the beam signal. The formed beam signal may then be provided for further processing and onwards transmission.

However, before the component signals are beam-formed using beam-forming weights, compensation weights are first applied to the component signals using a plurality of compensators 30. In some embodiments, a compensator is provided for each component signal. In other embodiments, a compensator is provided for all the component signals apart from one which forms a reference component signal. A compensator 30 may be provided in the form of a discrete multiplier. The discrete multiplier applies a complex weight to each component signal by performing a complex multiplication to compensate for phase and/or amplitude distortions introduced in the signal processing apparatus before the component signals are received in the beam-former 14. To accurately form the beams, it is the relative phase and amplitude of the component signals that is important. Consequently, without compensation if different component signals are distorted by different amounts, the quality of the beam-formed signal will be degraded.

Since the phase shifts introduced by the poly-phase filters 13 depend on the amount of frequency translation of the component signal in the poly-phase filter and the frequency translations are predetermined, the corresponding phase compensations are known in advance and can be pre-programmed into the compensators 30. However, the phase distortions introduced by one ADC relative to other ADCs are generally variable and therefore an analyser in the receive module will be required to receive and compare the sampling clock signals of the ADCs and based on an analysis of the sampling clocks determine a suitable phase correction for the set of component signals processed by an ADC to correct for any phase distortions introduced by that ADC relative to other ADCs.

Although the compensators are shown in FIG. 6 to be located before the phase and/or amplitude adjusters 28 in the signal paths such that compensation weights are applied before the beam weights are applied to the component signals, the compensation weight can instead be applied to the component signal after the beam weights are applied. Alternatively, the compensators and the beam-forming adjusters may be provided as a single discrete multiplier configured to multiply the component signal with a complex number selected to both compensate for any distortion introduced into the signal relative to the other component signals and the appropriate beam weight.

The application of the phase and/or amplitude compensations may be implemented in a corresponding way in the transmit module. With reference to FIG. 7, the beam-former 16 of the transmit module 15 comprises a duplicator 31 for duplicating each beam signal into a plurality of component signals corresponding to the plurality of antenna element signals of the transmit module and a beam-forming network 32 for each antenna element. If a beam spans more than one frequency channel, the beams may be frequency demultiplexed in a demultiplexer (not shown) before being duplicated. For example, two of the duplicators in FIG. 7 may relate to different frequency channels of the same beam. Each beam signal duplicator is shown to duplicate the beam signal into nine separate identical components for the nine antenna elements described with respect to FIGS. 2 and 3. However, it will be realised that in reality a much larger number of antenna elements and component signals would be used. Component signals are routed from the duplicator 31 to the beam-forming networks 32. In a system where an antenna element transmits a component for each beam produced by the antenna, one component from each duplicator is routed to every beam-forming network, one for each antenna element. Each beam-forming network includes a beam-forming phase and/or amplitude adjuster 33 for each component signal for applying appropriate beam weights to the component signals so as to generate the plurality of beams when the signals are transmitted by the antenna elements. The weighted component signals are provided to the synthesis poly-phase filters 17 for multiplexing into frequency stacked signals for the DACs. As in the example of FIG. 3, each poly-phase filter 17 multiplexes component signals for three separate antenna elements. In FIG. 7, each beam-forming network is shown to process five component signals. As described in the example of FIG. 3, two beams may share the same frequency channel and it is contemplated that two beam-forming phase and/or amplitude adjusters 33 may adjust component signals related to different beams but the same frequency channel. The weighted component signals are then summed prior to the synthesis poly-phase filter.

The beam-forming networks also include a plurality of compensators 34 for introducing phase and/or amplitude pre-distortions in the component signals for compensating for any phase and/or amplitude distortions applied between the beam-former 16 and the antenna elements. In some embodiments, a compensator is provided for each component signal, as shown in FIG. 7. In other embodiments, a compensator is provided for all the component signals apart from one which forms a reference component signal. A compensator 34 may be provided in the form of a discrete multiplier. Each discrete multiplier weights its respective component signal by carrying out a complex multiplication of the component signal with a complex weight to pre-compensate for phase and/or amplitude distortions introduced in the signal processing apparatus after the component signals are outputted from the beam-former. To accurately form the beams, ensuring that the actual beam pattern closely matches the desired beam pattern, it is the relative phase and amplitude of the component signals that is important. Consequently, without compensation, different component signals would be distorted by different amounts in the processing arrangement after the beamformer, and the quality of the beam-formed signal will be degraded.

Figure 7:
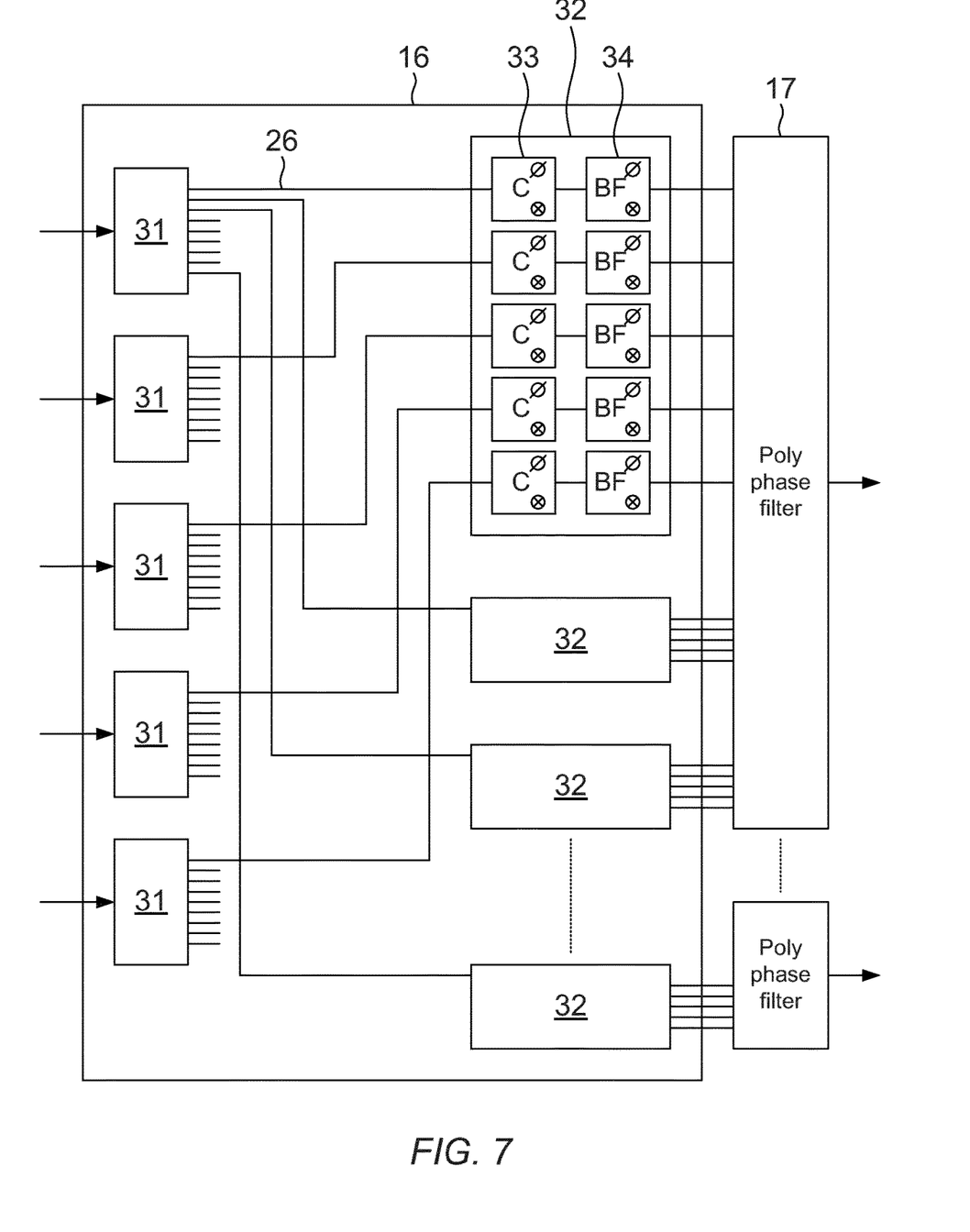
FIG. 7 is a schematic diagram of components of a beam-former of the transmit module according to some embodiments of the invention.

Although the compensators are shown in FIG. 7 to be located after the beam-forming phase and/or amplitude adjusters such that compensation weights are applied after the beam weights are applied to the component signals, the compensation weight can instead be applied to the component signals before the beam-forming weight are applied. Alternatively, the compensators and the beam-forming adjusters may be provided as a single multiplier configured to multiply the component signal with a complex number selected to both compensate for any distortion introduced into the signal relative to the other component signals and the appropriate beam weight.

Since the phase shifts introduced by the synthesis poly-phase filters depend on the frequency translation of the component signal in the synthesis poly-phase filter and the frequency translations are predetermined, the corresponding phase compensations are known in advance and can be pre-programmed into the compensators. However, the phase distortions introduced by one DAC relative to other DACs are generally variable and therefore an analyser in the transmit module will be required to receive and compare the sampling clocks of the DACs and based on an analysis of the sampling docks determine a suitable phase correction for the set of component signals processed by a DAC to correct for phase distortions introduced by that DAC relative to other DACs. It is contemplated that a single analyser may be used for both the receive module and the transmit module.

It will be appreciated that in a receive or transmit system in which each ADC or DAC handles a composite signal comprising N antenna element signals with M frequency channels per antenna element, every $N^{th}$ component signal for a beam would be distorted equally by the poly-phase filter since they would be down-converted from or up-converted to the same frequency. However, every $N^{th}$ component would be distorted by a different amount by the ADC or DAC since different ADCs and DACs have clock signals with different clock edges. It is contemplated that for each beam, a reference component signal is selected. Moreover, it is determined which component signals of the beams are converted from/to the same frequency as the reference component signal but handled by a different ADC or DAC. The analyser determines for each of these component signals the phase distortion relative to the reference signals introduced by the ADCs and DACs. This phase distortion would be the same for all the component signals handled by the same ADC or DACs. It is further contemplated that for a given component signal a plurality of compensation complex weights can be determined, each corresponding to a relative distortion introduced by a component within the processing arrangement. The compensation complex weights can then be multiplied to determine a final compensation weight with which to weight the component signal. In the present embodiment, a first compensation complex weight may first be obtained from a memory of the receive or transmit module to compensate for the relative distortion introduced by the poly-phase filter and the first complex weight may be multiplied by a second complex weight corresponding to the phase distortion determined by the analyser for the ADC or DAC with which the component signal is associated to determine a final compensation weight with which to weight the component signal.

It will be appreciated that although the phase corrections required to compensate for any phase distortion in the poly-phase filters have been described to be predetermined, the system may be reconfigured to allow stored or pre-programmed compensation weights to be updated. In more detail, the receive system and the transmit system may be configured for a particular bandwidth of the antenna elements and the frequency converters may be pre-configured to frequency translate each signal by a predetermined amount. However, it is contemplated that some systems may need to be reconfigurable if the required bandwidth to be handled by the satellite changes. The frequency of the local oscillator signal provided to each frequency converter may change when the system is reconfigured for new frequency channels and bandwidths and the frequency from/to which each antenna signal is converted may then also change. The distortion applied by the system to compensate for the phase shift applied by the poly-phase filter may then also need to be reconfigurable from the control stations on ground. For example, it is contemplated that a control signal will be sent to update the compensation weights.

Figure 8:
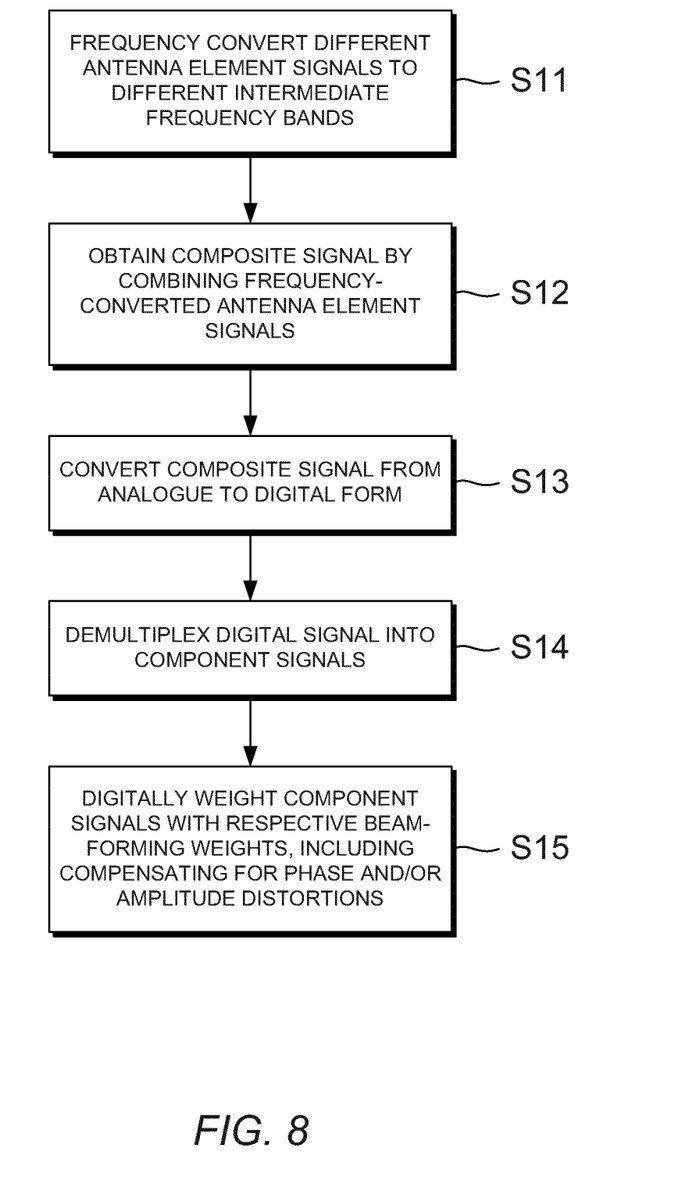
FIG. 8 is a flowchart illustrating a method performed by the receive module of FIG. 2.

With reference to FIG. 8, a method for use with an antenna with a plurality of antenna elements is illustrated, according to an embodiment of the present invention. The method corresponds to the method performed by the receive system shown in FIGS. 2 and 4, in which the antenna provides a radiation pattern including a plurality of beams.

First, in step Su different antenna element signals within a group of antenna element signals are frequency-converted to different intermediate frequency bands. In the apparatus shown in FIG. 4, step S11 is carried out by the frequency converters 10 for the group of three antenna element signals.

Next, in step S12 the frequency-converted antenna element signals in the different frequency bands are combined, to obtain the composite signal. In the apparatus shown in FIG. 4, step S12 is carried out by the combiner 11 for the frequency-converted antenna element signals outputted by the frequency converters 10. As shown in FIG. 4, the plurality of antenna element signals are stacked with respect to each other in frequency in the composite signal 25 outputted by the combiner 11.

Then, in step S13 the composite signal outputted by the combiner 11 is converted from analogue to digital form. In the apparatus shown in FIG. 4, step S12 is carried out by the ADC 12.

Then, in step S14 the digital signal outputted by the ADC 12 is demultiplexed into component signals present in said antenna element signals. In the above-described embodiments the demultiplexing is carried out by an analysis poly-phase filter 13, but in other embodiments other types of demultiplexer such as analytical signal per channel filter, multi-stage half-bank filter could be used for step S14.

Then, in step S15 the demultiplexed component signals are digitally weighted with respective beam-forming weights. By digitally weighting the individual component signals, the phase relationship and amplitude relationship between each component signal of a beam and the other component signals of the same beam can be controlled. For example, the digital weights for component signals in one beam can be applied using the beamforming network 27 shown in FIG. 6.

In addition, compensation weights are also applied to the component signals to compensate for phase and/or amplitude distortions between component signals associated with the same frequency channel and related to the same beam. Specifically, the component signals are compensated for distortions which arise during the analogue-to-digital conversion and demultiplexing steps (S13 and S14). As described above, depending on the embodiment, the compensation weights can be applied at the same time as the digital weights in step S15, or can be applied separately.

Figure 9:
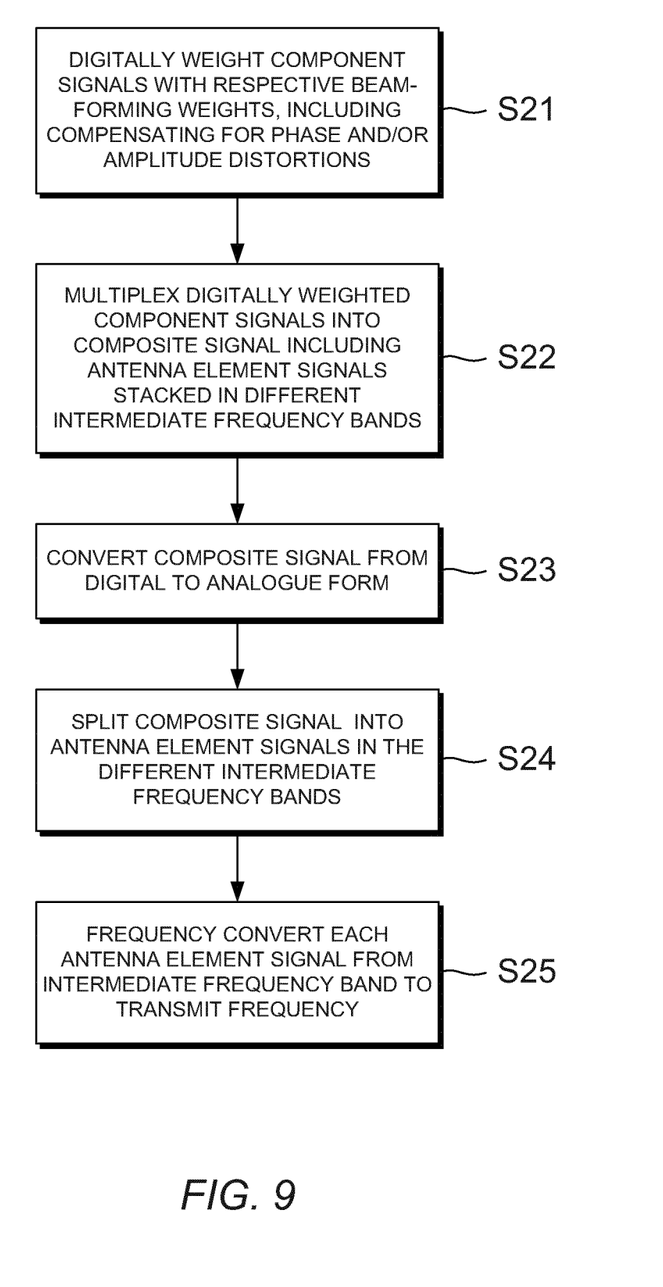
FIG. 9 is a flowchart illustrating a method performed by the transmit module of FIG. 3.

With reference to FIG. 9, a method for use with an antenna with a plurality of antenna elements is illustrated, according to an embodiment of the present invention. The method corresponds to the method performed by the transmit system shown in FIG. 3, in which the antenna provides a radiation pattern including a plurality of beams.

First, in step S21 the component signals are digitally weighted to provide each component signal of a beam with a phase relationship and amplitude relationship to the other component signals of the same beam. In the apparatus shown in FIG. 3, step S21 is performed by the beamformer 16, and in particular by the beamforming network 32 shown in FIG. 7. As described above, the beamforming network 32 can also apply the compensation weights, or alternatively compensation can be performed in a separate stage.

Next, in step S22 the digitally-weighted component signals for a group of antenna element signals, outputted by the beamformer, are multiplexed into the composite signal in which the antenna element signals stacked with respect to each other in frequency. In the apparatus shown in FIG. 3, step S22 is carried out by the synthesis poly-phase filter 17, although in other embodiments a different type of multiplexer such as that based on per channel filter and multi-stage half-bank filter could be used.

Then, in step S23 the composite signal is converted from digital to analogue form. In the apparatus shown in FIG. 3, step S23 is carried out by the DAC 18.

Then, in step S24 digital signal outputted by the DAC 18 is split into the antenna element signals in the different intermediate frequency bands. In the apparatus shown in FIG. 3, step S24 is carried out by the splitter 19.

Then, in step S25 each one of the antenna element signals is frequency-converted from the intermediate frequency band to the frequency at which it will be transmitted by a respective antenna element. In the apparatus shown in FIG. 3, frequency conversion in step S25 is carried out by the frequency converters 20.

In the methods of FIGS. 8 and 9, the component signals can be digitally weighted using any of the above-described methods. For example, the phase and/or amplitude of the component signals can be adjusted by applying a weight to a respective component signal, where the weight applied to the signal includes both a beam-forming weight and a compensation weight. The compensation weight can be selected to compensate for phase and/or amplitude distortions which arise during processing. As described above, distortions relative to other component signals for the same beam can be introduced by the ADC 12, demultiplexer 13, DAC 18, and multiplexer 19.

Whilst specific examples of the invention have been described, the scope of the invention is defined by the appended claims and not limited to the examples. The invention could therefore be implemented in other ways, as would be appreciated by those skilled in the art.

For example, it will be realised that although each ADC or DAC has been shown in FIGS. 2, 3 and 4 to process three antenna element signals and each antenna element signal includes four frequency channels, this is just one example, and the invention is not limited to this example. ADCs or DACs configured to handle any number of antenna element signals can be used and the antenna element signals can include any suitable number of frequency channels. It is further contemplated that the system may be reconfigured to provide a different number of antenna element signals comprising a different number of frequency channels to each ADC or DAC in orbit. In some embodiments, each ADC and DAC could be arranged to only handle one antenna element signal, in which case steps S11 and S12 of FIG. 8 and steps S24 and S25 could be omitted.

Moreover, although the invention has been described with respect to a satellite, it would also be applicable to other spacecraft systems and also for systems not suitable for use in space. The invention is applicable to any system that uses a beam-former for beam-forming a number of component signals.

The invention claimed is:

1. An apparatus for an antenna with a plurality of antenna elements, the antenna providing a radiation pattern including one or more beams and the apparatus comprising:
    a digital beam-former for digitally weighting component signals corresponding to the one or more beams with respective beam-forming weights to provide each component signal of a beam with a phase relationship and amplitude relationship to other component signals of the same beam; and
    a processing arrangement comprising:
        a plurality of frequency converters, each frequency converter of the plurality of frequency converters being associated with a separate antenna element of the plurality of antenna elements and being configured to frequency convert an antenna element signal associated with the separate antenna element to an intermediate frequency band, wherein each frequency converter is configured to frequency convert its antenna element signal to a different frequency band such that the frequency-converted antenna element signals are stacked in frequency with respect to each other, an analog-to-digital converter for converting a composite signal comprising a plurality of said stacked antenna element signals from analog to digital form and a demultiplexer for demultiplexing the digital signal into component signals present in said antenna element signals for providing to the digital beam-former, the demultiplexer comprising a poly-phase filter, wherein the plurality of stacked antenna element signals comprise a plurality of signals corresponding to the plurality of antenna elements; or
        a multiplexer for multiplexing beam-formed component signals, for forming a number of antenna element signals, from the digital beam-former into a composite signal comprising said number of antenna element signals stacked with respect to each other in frequency and a digital-to-analog converter for converting the composite signal from digital to analog form, and a plurality of frequency converters, each frequency converter of the plurality of frequency converters being associated with a separate antenna element of the plurality of antenna elements and being configured to frequency convert an antenna element signal from one of said frequency bands to a frequency at which it will be transmitted by a respective antenna element; the multiplexer comprising a synthesis poly-phase filter, wherein the plurality of stacked antenna element signals comprise a plurality of signals corresponding to the plurality of antenna elements;
    the apparatus further comprising compensation means for compensating for at least one out of phase and amplitude distortions between component signals associated with the same frequency channel and related to the same beam arising in the processing arrangement, wherein for a given component signal, the compensation means are configured to determine a plurality of compensation complex weights each corresponding to a relative distortion introduced by a component within the processing arrangement, and multiply the plurality of compensation complex weights to determine a final compensation weight with which to weight the component signal, and the component within the processing arrangement comprises one of the analog-to-digital converter, the poly-phase filter, the synthesis poly-phase filter, or the digital-to-analog converter.

2. The apparatus according to claim 1, wherein the compensation means are provided in said digital beam-former.

3. The apparatus according to claim 2, wherein the digital beam-former comprising adjusters for adjusting at least one out of phase and amplitude of the component signals, each adjuster being configured to apply a weight to a respective component signal corresponding to a beam-forming weight and a compensation weight, the compensation weight being selected to compensate for at least one out of a phase and amplitude distortion arising in the processing arrangement relative to other component signals for the same beam.

4. The apparatus according to claim 1, wherein the compensation means are provided separately from said beam-former in said processing arrangement, the compensation means comprising adjusters for adjusting at least one out of phase and amplitude of the component signals, each adjuster being configured to apply a compensation weight to a respective component signal selected to compensate for at least one out of a phase and amplitude distortion arising in the processing arrangement relative to other component signals for the same beam.

5. The apparatus according to claim 3, wherein the compensation weight is a complex number and wherein said adjusters are configured to adjust their respective component signals by carrying out a complex multiplication.

6. The apparatus according to claim 1, wherein the apparatus comprises a receive system and wherein said processing arrangement comprises:
    a plurality of groups of frequency converters, one of said groups comprising said plurality of frequency converters and each frequency converter in each group is configured to frequency convert its antenna element signal to a different frequency band;
    a plurality of combiners, each combiner being associated with a group of frequency converters and being configured to combine the antenna element signals in said different frequency bands to a composite signal;
a plurality of analog to digital converters, each analog to digital converter being configured to convert a different composite signal into digital form; and
a plurality of demultiplexers for demultiplexing the converted signals.

7. The apparatus according to claim 6, wherein the compensation means being configured to compensate for a phase distortion in the demultiplexer and further being configured to apply a compensation determined based on intermediate frequency band from which component signal is down-converted in the demultiplexer.

8. The apparatus according to claim 6, wherein the compensation means is configured to compensate for a phase distortion generated in the analog to digital converter and the compensation means further being configured to apply a compensation determined based on the timing of a clock edge of a sampling clock of the analog to digital converter relative to the timing of clock edges of sampling clocks of other analog to digital converters of the plurality of analog to digital converters.

9. The apparatus according to claim 1, wherein the apparatus comprise a transmit module and wherein the processing arrangement comprises:
a plurality of multiplexers for multiplexing beam-formed component signals, each multiplexer being configured to multiplex beam-formed component signals for forming a number of antenna element signal into a composite signal comprising said number of antenna element signals stacked with respect to each other in different intermediate frequency bands;
a plurality of digital to analog converters, each digital to analog converter being configured to convert a different composite signal into analog form; and
a plurality of splitters for splitting each digital to analog converted signal into the antenna element signals present in said digital to analog converted signal in the different intermediate frequency bands.

10. The apparatus according to claim 9, wherein the compensation means being configured to compensate for a phase distortion by the multiplexer and further being configured to apply a compensation determined based on intermediate frequency band to which component signal is up-converted in the multiplexer.

11. The apparatus according to claim 9, wherein the compensation means is configured to compensate for a phase distortion generated in the digital to analog converter and the compensation means further being configured to apply a compensation determined based on the timing of a clock edge of a sampling clock of the digital to analog converter relative to the timing of clock edges of sampling clocks of other digital to analog converters of the plurality of digital to analog converters.

12. A method for use with an antenna with a plurality of antenna elements, the antenna providing a radiation pattern including one or more beams, the method comprising:
digitally weighting component signals corresponding to the one or more beams with respective beam-forming weights to provide each component signal of a beam with a phase relationship and amplitude relationship to other component signals of the same beam; and
using a processing arrangement comprising a plurality of frequency converters, an analog-to-digital converter and a demultiplexer to frequency convert different antenna element signals within a group of antenna element signals to different intermediate frequency bands such that the frequency-converted antenna element signals are stacked in frequency with respect to each other, convert a composite signal comprising a plurality of stacked antenna element signals from analog to digital form, and demultiplex the digital signal into component signals present in said antenna element signals before digitally weighting the component signals, the demultiplexer comprising a poly-phase filter, wherein the plurality of stacked antenna element signals comprise a plurality of signals corresponding to the plurality of antenna elements; or
using a processing arrangement comprising a multiplexer, a plurality of frequency converters, and a digital-to-analog converter to multiplex the digitally-weighted component signals, to form a number of antenna element signals, into a composite signal comprising said number of antenna element signals stacked with respect to each other in frequency, frequency convert each one of the antenna element signals to a frequency at which a respective antenna element signal will be transmitted by a respective antenna element, and convert the composite signal from digital to analog form, the multiplexer comprising a synthesis poly-phase filter, wherein the plurality of stacked antenna element signals comprise a plurality of signals corresponding to the plurality of antenna elements;
wherein the method further comprises:
compensating for at least one out of phase and amplitude distortions between component signals associated with the same frequency channel and related to the same beam arising during conversion and multiplexing or demultiplexing of the component signals, by determining a plurality of compensation complex weights for a given component signal, each corresponding to a relative distortion introduced by a component in the processing arrangement, and multiplying the plurality of compensation complex weights to determine a final compensation weight with which to weight the component signal, and the component within the processing arrangement comprises one of the analog-to-digital converter, the poly-phase filter, the synthesis poly-phase filter, or the digital-to-analog converter.

13. The method of claim 12, wherein digitally weighting the component signals comprises:
adjusting at least one out of phase and amplitude of the component signals, by applying a weight to a respective component signal corresponding to a beam-forming weight and a compensation weight, wherein the compensation weight is selected to compensate for at least one out of a phase and amplitude distortion arising during conversion and multiplexing or demultiplexing of the component signals, relative to other component signals for the same beam.

14. The method of claim 12, wherein the method comprises converting the composite signal from analog to digital form and demultiplexing the digital signal into the component signals before digitally weighting the component signals, and further comprises:
using a plurality of groups of frequency converters, one of said groups comprising said plurality of frequency converters, to frequency convert different antenna element signals within a group of antenna element signals to different intermediate frequency bands; and
combining the antenna element signals in said different frequency bands to obtain the composite signal to be converted from analog to digital form.

15. The method of claim 12, wherein the method comprises multiplexing the digitally-weighted component signals into the composite signal and converting the composite signal from digital to analog form, and wherein the number of antenna element signals comprised in the composite signal are stacked with respect to each other in different intermediate frequency bands, and the method further comprises:

splitting the digital to analog converted signal into the antenna element signals present in said digital to analog converted signal in the different intermediate frequency bands.

* * * * *